2,834,337
WATER HEATING SYSTEM

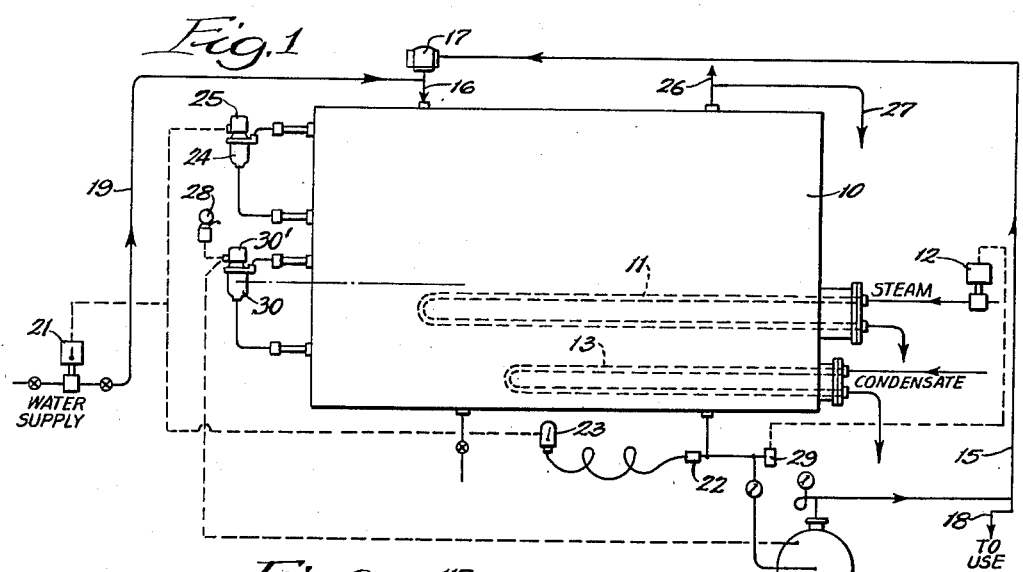
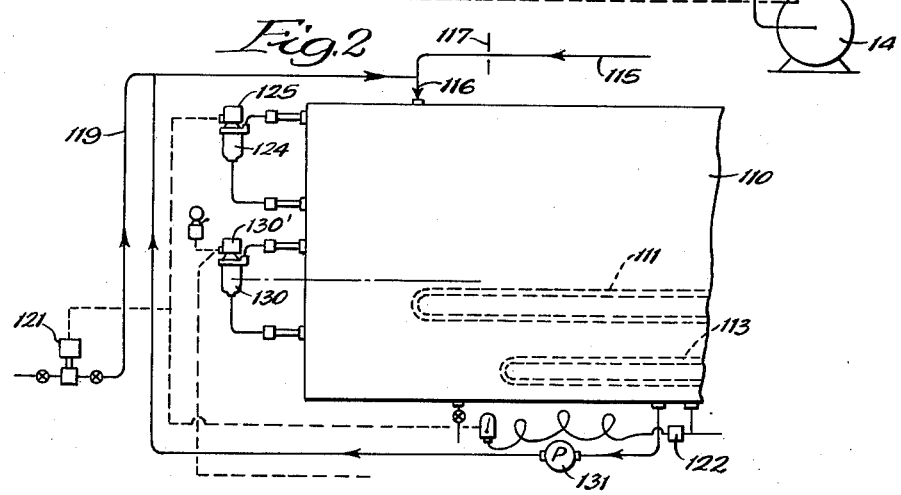
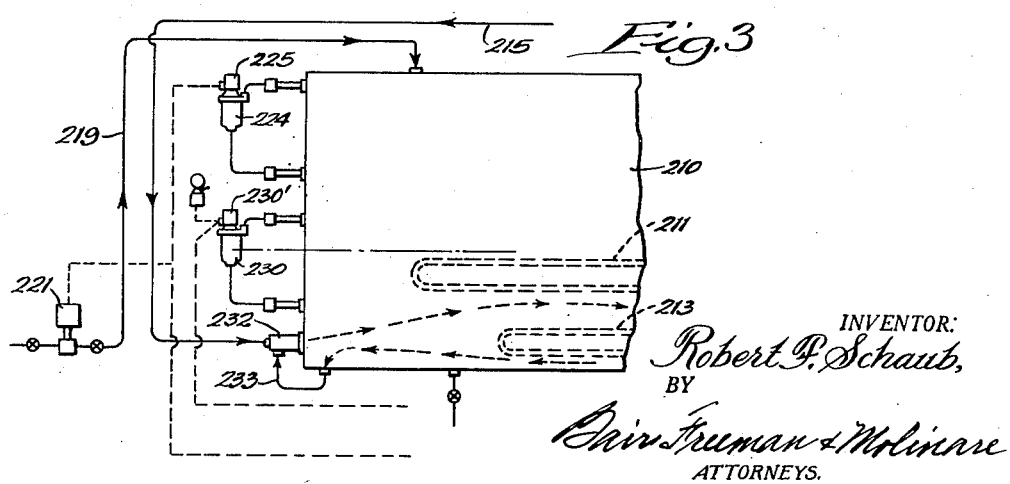

Robert F. Schaub, Chicago, Ill., assignor to Fred H. Schaub Engineering Co., Inc., Chicago, Ill., a corporation of Illinois Application September 7, 1954, Serial No. 454,506

2 Claims. (Cl. 126—362)

This invention relates to water heating systems and more particularly to a system for maintaining a uniform high temperature water to supply variable load requirements with a substantially constant heat input.

Many hot water consuming plants and institutions, such as laundries, and the like, have widely varying demands for hot water but require that the water be supplied at a substantially uniformly high temperature when needed. If a heating system is employed, in which steam input requirement closely follows hot water demand, as has been customary, the temporary high rates of heating steam demanded are often in excess of the capacity of the steam generator to supply it.

In my copending application, Serial No. 285,403, filed May 1, 1952, now Patent 2,756,739, issued July 31, 1956, I have disclosed a water heating system which operates at a constant average heating rate but yet satisfies a widely fluctuating demand. The present invention relates to the same type of system which is in many ways a simplification of that disclosed in my copending application.

It is one of the objects of the present invention to provide a water heating system in which the heating capacity need not exceed the average demand rate but which is still capable of satisfying widely varying demands.

Another object is to provide a heating system in which the water is heated in a tank at a substantially uniform rate and cold water is supplied to the tank in variable amount in response to external load changes so as to maintain the water in the tank at the desired temperature for use.

Still another object is to provide a heating system in which the heating means operates at a substantially constant rate under all normal conditions, but is shut off if the temperature in the tank exceeds a predetermined safe value.

A further object is to provide a heating system in which water from the tank is constantly recirculated and mixed with returning hot water to maintain an intimate mixture of water in the tank.

According to one feature of the invention, the returning hot water passes through an ejector to induce a recirculation of water from the tank.

The above and other objects and features of the invention will be more readily apparent from the following description when read in connection with the accompanying drawing, in which:

Figure 1 is a diagrammatic view of a heating system embodying the invention; and Figs. 2 and 3 are partial views similar to Figure 1 illustrating modifications.

The heating system, as shown in Figure 1, is adapted to supply hot water at a uniform high temperature to a variable load, such as laundry wheels, or the like. The system, as shown, comprises a storage and heating tank 10 adapted to contain hot water and in which the water is heated at a substantially constant heat input rate. While any desired type of heating means can be employed, the water is heated, as illustrated, by a steam coil 11 mounted in the lower part of the tank and supplied with steam through a normally open electric shut-off valve 12. Heating means may also be a direct steam-water mixing device or a perforated steam dispersion tube, or the like. If desired, a secondary coil 13 may be mounted in the tank to act as a condensate cooling coil. In any event, the rate of heat input to the tank is normally substantially constant and is equal to the average demand of the load to be served.

Hot water is withdrawn from the tank by a pump 14 which boosts the water supply pressure through an external closed system 15 having a return connection 16 to the upper part of the tank. A spring loaded valve 17 is imposed in the return connection to open in response to a predetermined pressure thereby to maintain the water in the external system under the desired operating pressure. Water to supply the load is taken off from the external system, as indicated at 18. The pump 14 operates at a constant rate equal to the maximum demand for water of the load so that when the load is operating at less than maximum demand, water will be returned to the tank past the valve 17 and through the return connection 16.

Fresh cold water is supplied to the tank to make up for the water used through an inlet connection 19 controlled by an electric shut-off valve 21. The connection 19 can lead from any desired source of water, such as a conventional water supply, a water softener, a heat reclaimer, or the like. In any case, the water supplied through the connection 19 will be substantially below the desired operating temperature.

The supply of water to the tank is controlled through the valve 21 which in turn is controlled in response to the temperature of water in the tank. For this purpose, a temperature measuring unit, such as a standard thermostat bulb 22, is inserted either in the tank itself or in the piping connection from the tank to the pump and is connected to a control switch device 23 which will close a circuit when the temperature is above a preset value and open the circuit when the temperature is below that value. The switch 23 is connected to the valve 21 so that the valve 21 will be opened when the water temperature is above the desired value and will be closed when the water temperature is at or below the desired value. In this way, if the water in the tank tends to become too hot the valve 21 will be opened to supply cold water and reduce the tank temperature. When the tank temperature is at the correct value, the valve 21 will be closed. In this way, the water in the tank is maintained at all times at the desired temperature for use.

The valve 21 may also be controlled by a high level unit 24 connected to the tank at the upper part thereof and including a switch 25 in circuit with the valve 21. When the level in the tank is below the maximum for which the unit 24 is adjusted, the switch 25 will be closed so that the valve 21 may be opened and closed under control of the switch 23 only. If the level in the tank exceeds a predetermined value, the switch 25 will open to shut off valve 21 irrespective of switch 23 so that flooding of the tank will be avoided. The tank may also be connected to a vent 26 at its top having an overflow connection 27 thereto so that if any of the controls should fail, water can overflow from the tank through the overflow 27 to prevent damage to any of the parts.

In the event water is withdrawn from the tank to reduce the level therein to an excessively low value which would expose the heating coils 11 and might result in damage thereto, the pump 14 will be shut off. For this purpose, a low level device 30 is connected to the lower part of the tank and operates a switch 30'. The switch 30' is normally open, but if the level falls below the desired minimum value, it will close to energize the signal 28 and to stop the pump 14.

In operation of the system, when the demand for water is low, the major part of the water circulated by the pump 14 will be returned to the tank through the return connection 16. Since this water will be at the desired use temperature, and since heat is being added to the tank through the coils 11 and 13 at a constant rate, the temperature in the tank will tend to become too high. The temperature responsive controls 22 and 23 will therefore open the inlet valve 21 to add fresh water to the tank to maintain the temperature therein at the desired value. It will be understood that the control 23 and valve 21 may be a step-by-step control, a throttle control, or a simple on-off control, any of which can be used according to the invention.

During low demand periods, as described above, the level in the tank 10 will increase until the tank becomes substantially full. In the event the demand should continue at a low rate for an excessive time, the valve 21 might be shut off by the high level device 24 with heat continuing to be supplied to the water in the tank. To prevent raising the temperature of the water to an excessive value, a temperature responsive unit 29, such as a conventional theremostat bulb, is mounted in the outlet from the tank to the pump 14 and is connected to the valve 12. If the water temperature becomes excessive, the valve 12 will be closed to shut off the heat as a safety measure. During high demand periods substantially all of the water circulated by the pump 14 will be taken by the load so that no water will be returned through the return connection 16. Under these conditions some fresh cold water will be added through the inlet connection 19 at a rate equal to the rate at which water can be raised to the desired temperature by the heating coils. However, the water level in the tank will fall during high demand periods to supply the demands of the load in excess of the heating rate. In this way, with a very simple apparatus and very simple controls, a widely varying demand can be satisfied with a substantially constant heat input.

The system of Figure 2 is substantially similar to that of Figure 1 and parts therein corresponding to like parts in Figure 1 are indicated by the same reference numerals, plus 100. This construction may be substantially identical to that of Figure 1, except that the valve 17 is replaced by a fixed orifice 117 in the external circulating system to provide pressure in the system. In addition, a relatively small circulating pump 131 is provided having its inlet connected to the lower part of the tank and its outlet connected to the return connection 116. Preferably, the outlet of the pump is connected to the line 119 at some distance from the return connection 116 to mix with the incoming fresh water and to be discharged into the tank therewith.

With this construction, the small pump 131 is constantly circulating and constantly mixes hot water from the tank with the incoming cold water before it is supplied to the tank. Due to the constant circulation which will occur, even though the load is consuming substantially all of the water pumped by the pump 14, stratification is prevented and the water in the tank is maintained intimately mixed so that its temperature will be uniform.

Figure 3 illustrates still another arrangement for preventing stratification and maintaining uniform temperature of water in the tank under all operating conditions. As shown in this figure, the return line 215 is connected to the inlet of a conventional ejector 232. The ejector is connected by a line 233 to the bottom of the tank so that water will be withdrawn from the tank and fed into the injector to mix with the return hot water. In this way, a relatively small amount of water returning through the connection 215 will induce a circulation of a relatively large quantity of water from the tank thereby to maintain the water in the tank thoroughly and uniformly mixed In all embodiments the heating means functions at a substantially constant rate equal to the average demand so that a very efficient system is provided operating at minimum cost and with minimum installation cost. In all cases, the controls are relatively simple but provide a uniform temperature of the water supply.

While several embodiments of the invention have been shown and described in detail herein, it will be understood that they are illustrative only and are not intended as a definition of the scope of the invention, reference being had for this purpose to the appended claims.

What is claimed is:

1. A water heating system comprising a tank adapted to contain hot water, heating means to heat water in the tank at a substantially constant rate, an external circulating system having an outlet connection from the tank and a return connection to the tank and from which hot water is taken for use, a pump to cause a substantially constant circulation of water through the external system, said pump having a capacity at least as great as the maximum demand for hot water, a connection to the tank to supply cold water thereto, a control valve in the last named connection, and control means responsive to the temperature of the water withdrawn from the tank to open the valve when the temperature exceeds a predetermined maximum and close the valve when the temperature is below a predetermined minimum.

2. A water heating system comprising a tank adapted to contain hot water, heating means to heat water in the tank at a substantially constant rate, an external circulating system having an outlet connection from the tank and a return connection to the tank and from which hot water is taken for use, a pump to circulate a constant volume of water at least as great as the maximum demand under pressure from the tank through the circulating system, normally closed valve means in the return connection adjacent to the tank to open in response to a predetermined pressure, a connection to the external system between the pump and valve means to draw off hot water for use a connection to the tank to supply cold water thereto, a control valve in the last named connection, and control means responsive to the temperature of water withdrawn from the tank to open the valve when the temperature exceeds a predetermined maximum and close the valve when the temperature is below a predetermined minimum.

References Cited in the file of this patent

UNITED STATES PATENTS

| Number | Name | Date |
|---|---|---|
| 725,707 | Hoffman | Apr. 21, 1903 |
| 821,939 | Harris | May 29, 1906 |
| 1,773,976 | Erickson | Aug. 26, 1930 |
| 1,780,379 | Durdin | Nov. 4, 1930 |
| 1,886,135 | Tannehill | Nov. 1, 1932 |
| 1,967,706 | Carroll | July 24, 1934 |
| 1,983,199 | Stith | Dec. 4, 1934 |
| 2,265,108 | Berman | Dec. 2, 1941 |
| 2,290,347 | Moore et al. | July 21, 1942 |
| 2,296,325 | Bak | Sept. 22, 1942 |
| 2,629,551 | Audino | Feb. 24, 1953 |